US012725530B2

(12) United States Patent
Loh

(10) Patent No.: US 12,725,530 B2
(45) Date of Patent: Sep. 1, 2026

(54) DEVICE AND METHOD FOR RECOMMENDING EDUCATIONAL CONTENT

(71) Applicant: Socra AI Inc., Seoul (KR)

(72) Inventor: Hyun Bin Loh, Seoul (KR)

(73) Assignee: Socra AI Inc., Seoul (KR)

( * ) Notice: Subject to any disclaimer, the term of this patent is extended or adjusted under 35 U.S.C. 154(b) by 1003 days.

(21) Appl. No.: 17/853,015

(22) Filed: Jun. 29, 2022

(65) Prior Publication Data

US 2023/0005383 A1 Jan. 5, 2023

(30) Foreign Application Priority Data

Jul. 1, 2021 (KR) ........................ 10-2021-0086400

(51) Int. Cl.
*G09B 7/04* (2006.01)
*G06F 17/18* (2006.01)

(52) U.S. Cl.
CPC ................ *G09B 7/04* (2013.01); *G06F 17/18* (2013.01)

(58) Field of Classification Search
CPC .. G09B 7/04; G09B 7/02; G06F 17/18; G06N 5/041; G06N 3/045; G06N 3/091
See application file for complete search history.

(56) References Cited

U.S. PATENT DOCUMENTS

| | | | | |
|---|---|---|---|---|
| 6,427,063 | B1 * | 7/2002 | Cook | G09B 7/00 434/350 |
| 7,052,277 | B2 * | 5/2006 | Kellman | G09B 7/00 434/323 |
| 9,886,867 | B2 * | 2/2018 | Baphna | G09B 7/00 |
| 2005/0053908 | A1 * | 3/2005 | Satheesh | G09B 5/06 434/350 |
| 2019/0164082 | A1 * | 5/2019 | Wu | G06N 20/00 |

FOREIGN PATENT DOCUMENTS

| | | | |
|---|---|---|---|
| JP | 2017-520068 | A | 7/2017 |
| JP | 2019-144504 | A | 8/2019 |
| KR | 10-2016-0009155 | A | 1/2016 |
| KR | 10-2016-0109913 | A | 9/2016 |

* cited by examiner

*Primary Examiner* — Jay Trent Liddle
*Assistant Examiner* — Selwa A Alsomairy
(74) *Attorney, Agent, or Firm* — USX IP LLC

(57) ABSTRACT

Provided are a device and method for recommending educational content. The method includes acquiring a user's learning data, wherein the learning data includes at least one of the user's first learning ability information at a first time point, the user's second learning ability information at a second time point, and the user's question answering information, acquiring the user's target learning ability information on the basis of the learning data, determining a neural network model on the basis of the target learning ability information, distributing resources corresponding to the determined neural network model, and acquiring educational content to be recommended to the user through the determined neural network model.

9 Claims, 9 Drawing Sheets

DEVICE AND METHOD FOR RECOMMENDING EDUCATIONAL CONTENT

CROSS-REFERENCE TO RELATED APPLICATION

This application claims priority to and the benefit of Korean Patent Application No. 2021-0086400, filed on Jul. 1, 2021, the disclosure of which is incorporated herein by reference in its entirety.

BACKGROUND

1. Field of the Invention

The present invention relates to a method, device, and system for recommending educational content. Specifically, the present invention relates to a method and device for distributing resources required for an operation of recommending educational content on the basis of a user's learning ability.

2. Discussion of Related Art

With the development of artificial intelligence technology, an educational technology for diagnosing a user's learning ability and recommending educational content on the basis of the diagnosis result is attracting attention. In particular, the field of public education demands a technology for ensuring the fairness of education by appropriately providing educational content so that each user can have his or her own target learning ability.

However, the related art is aimed at improving educational effects using more advanced algorithms and more computing resources. This causes a problem in that users who pay more are more likely to experience higher educational effects.

Accordingly, it is necessary to develop an educational content recommendation device and method for maximizing educational effects for a user while ensuring the fairness of education by appropriately recommending educational content in consideration of the user's learning ability information.

SUMMARY OF THE INVENTION

The present invention is directed to providing an educational content recommendation method, device, and system for providing educational content on the basis of a user's learning ability.

Objects of the present invention are not limited to that described above, and other objects which are not described above will be clearly understood by those of ordinary skill in the art from the specification and accompanying drawings.

According to an aspect of the present invention, there is provided a method of recommending educational content, the method including acquiring learning data of a user, wherein the learning data includes at least one of first learning ability information of the user at a first time point, second learning ability information of the user at a second time point, and question answering information of the user, acquiring target learning ability information of the user on the basis of the learning data, determining a neural network model on the basis of the target learning ability information, distributing resources corresponding to the determined neural network model, and acquiring educational content to be recommended to the user through the determined neural network model. The neural network model may be determined to be a first neural network model which demands first resources when the target learning ability information of the user includes a first target learning ability value and may be determined to be a second neural network model which demands second resources greater than the first resources when the target learning ability information of the user includes a second target learning ability value lower than the first target learning ability value.

According to another aspect of the present invention, there is provided a device for receiving learning data of a user from an external user terminal and recommending educational content, the device including a transceiver configured to communicate with the user terminal and a controller configured to acquire the learning data of the user through the transceiver and determine educational content on the basis of the learning data. The controller acquires the learning data, wherein the learning data includes at least one of first learning ability information of the user at a first time point, second learning ability information of the user at a second time point, and question answering information of the user, acquires target learning ability information of the user on the basis of the learning data, determines a neural network model on the basis of the target learning ability information, distributes resources corresponding to the determined neural network model, and acquires educational content to be recommended to the user through the determined neural network model. The neural network model may be determined to be a first neural network model which demands first resources when the target learning ability information of the user includes a first target learning ability value and may be determined to be a second neural network model which demands second resources greater than the first resources when the target learning ability information of the user includes a second target learning ability value lower than the first target learning ability value.

Solutions to the objects of the present invention are not limited to those described above, and other solutions which have not described above will be clearly understood by those of ordinary skill in the art from the specification and accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
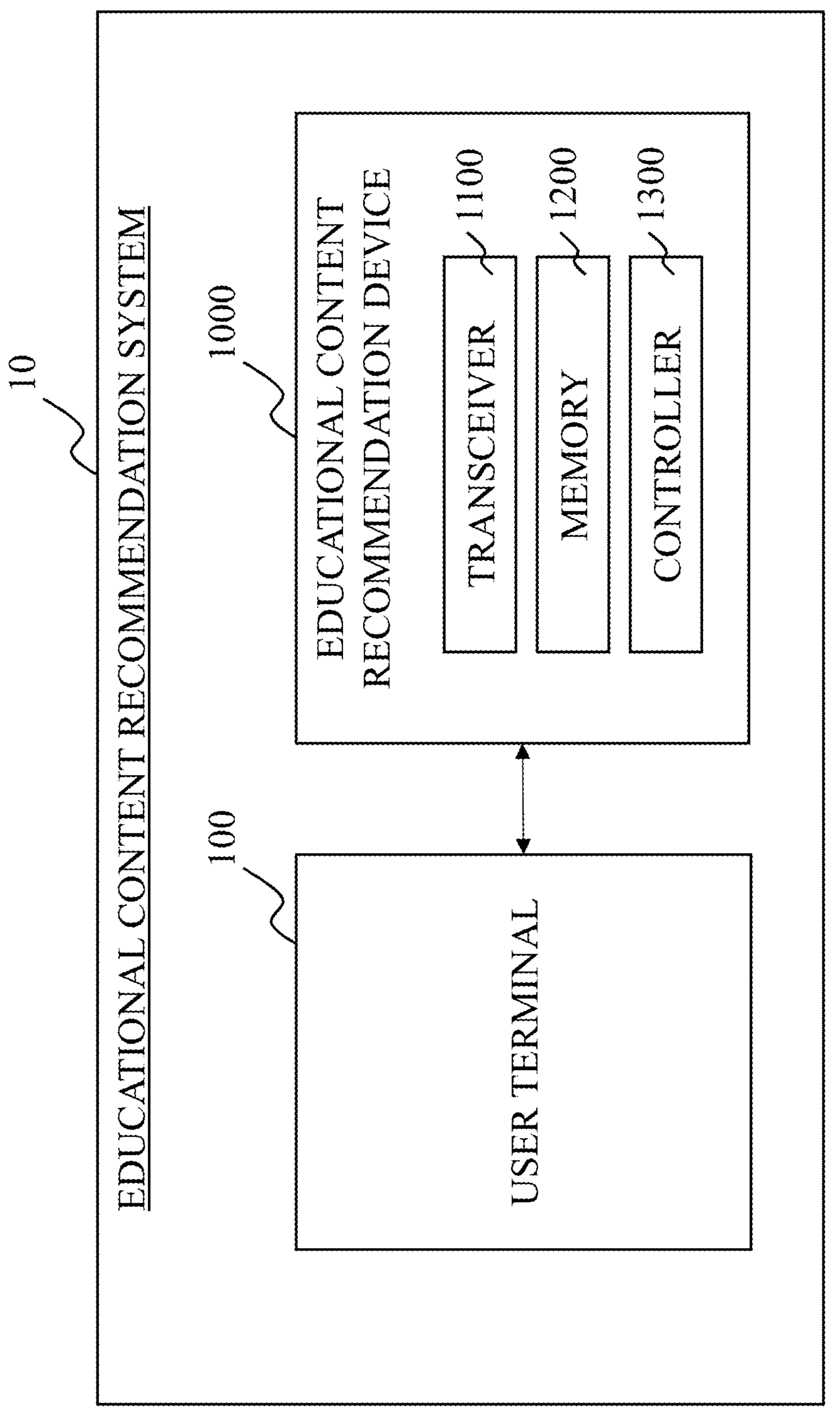
FIG. 1 is a block diagram schematically illustrating an educational content recommendation system according to an exemplary embodiment of the present invention.

The above-described objects, features, and advantages of the present invention will be apparent through the following detailed description in connection with the accompanying drawings. Since the present invention can be modified in various ways and have various embodiments, specific embodiments will be illustrated in the drawings and described in detail.

Throughout the specification, like reference numerals basically refer to like elements. Elements having the same function within the scope of the same idea shown in the drawings of each embodiment will be described using the same reference numerals, and overlapping descriptions thereof will be omitted.

When it is determined that a detailed description of a known function or element related to the present invention may unnecessarily obscure the subject matter of the present invention, the detailed description will be omitted. Also, numerals (e.g., first and second) used in the description of the specification are merely identifiers for distinguishing one element from another.

As used herein, the suffixes "module" and "unit" for elements used in the following embodiments are given or interchangeably used in consideration of only the ease of drafting the specification and do not have a meaning or role distinct from each other.

In the following embodiments, the singular forms are intended to include the plural forms as well unless the context clearly indicates otherwise.

The "comprises," "comprising," "includes," "including," "has," "having," etc. mean the presence of features or elements stated herein and do not preclude the possibility of adding one or more other features or elements.

In the drawings, the sizes of elements may be exaggerated or reduced for convenience of description. For example, the size and thickness of each element shown in the drawings are arbitrarily shown for the convenience of description, and thus the present invention is not necessarily limited to those shown in the drawings.

When a certain embodiment can be implemented differently, a specific process may be performed in a different order than that described. For example, two processes described in succession may be performed substantially simultaneously or performed in a reverse order of that described.

In the following embodiments, when elements and the like are referred to as being connected, the elements may be directly connected or indirectly connected with elements interposed therebetween.

For example, when elements and the like are referred to as being electrically connected herein, the elements and the like may be directly and electrically connected or may be indirectly and electrically connected with an element and the like interposed therebetween.

A method of recommending educational content according to an exemplary embodiment of the present invention may include an operation of acquiring learning data of a user, wherein the learning data includes at least one of first learning ability information of the user at a first time point, second learning ability information of the user at a second time point, and question answering information of the user, an operation of acquiring target learning ability information of the user on the basis of the learning data, an operation of determining a neural network model on the basis of the target learning ability information, an operation of distributing resources corresponding to the determined neural network model, and an operation of acquiring educational content to be recommended to the user through the determined neural network model. The neural network model may be determined to be a first neural network model which demands first resources when the target learning ability information of the user includes a first target learning ability value and may be determined to be a second neural network model which demands second resources greater than the first resources when the target learning ability information of the user includes a second target learning ability value lower than the first target learning ability value.

In the method of recommending educational content, the operation of acquiring the target learning ability information may further include an operation of calculating maximum learning ability information on the basis of the learning data and an operation of acquiring the target learning ability information on the basis of the maximum learning ability information. The target learning ability information may be determined to be a predetermined ratio of a maximum learning ability value included in the maximum learning ability information.

In the method of recommending educational content, the operation of calculating the maximum learning ability information may further include an operation of generating a probability distribution graph related to a predicted learning ability of the user on the basis of at least one of the first learning ability information, the second learning ability information, and the question answering information; and an operation of calculating the maximum learning ability information on the basis of the probability distribution graph.

In the method of recommending educational content, the operation of calculating the maximum learning ability information on the basis of the probability distribution graph may include an operation of acquiring rate-of-change information of the probability distribution graph, an operation of acquiring first rate-of-change information including a value smaller than a predetermined rate of change in the rate-of-change information, and an operation of determining a predicted learning ability of the user at a time point corresponding to the first rate-of-change information as the maximum learning ability information.

According to an exemplary embodiment of the present invention, a computer-readable recording medium on which a program for a computer to perform at least one of the above-described methods of recommending educational content is recorded.

A device for receiving learning data of a user from an external user terminal and recommending educational content according to an exemplary embodiment of the present invention includes a transceiver configured to communicate with the user terminal and a controller configured to acquire the learning data of the user through the transceiver and determine educational content on the basis of the learning data. The controller is configured to acquire the learning data, wherein the learning data includes at least one of first learning ability information of the user at a first time point, second learning ability information of the user at a second time point, and question answering information of the user, acquire target learning ability information of the user on the basis of the learning data, determine a neural network model on the basis of the target learning ability information, distribute resources corresponding to the determined neural network model, and acquire educational content to be recommended to the user through the determined neural network model. The neural network model may be determined to be a first neural network model which demands first resources when the target learning ability information of the user includes a first target learning ability value and may be determined to be a second neural network model which demands second resources greater than the first resources when the target learning ability information of the user includes a second target learning ability value lower than the first target learning ability value.

In the device for recommending educational content, the controller may be configured to acquire maximum learning ability information on the basis of the learning data and acquire the target learning ability information on the basis of the maximum learning ability information. The target learning ability information may be determined to be a predetermined ratio of a maximum learning ability value included in the maximum learning ability information.

In the device for recommending educational content, the controller may be configured to generate a probability distribution graph related to a predicted learning ability of the user on the basis of at least one of the first learning ability information, the second learning ability information, and the question answering information and calculate the maximum learning ability information on the basis of the probability distribution graph.

In the device for recommending educational content, the controller may be configured to acquire rate-of-change information of the probability distribution graph, acquire first rate-of-change information including a value smaller than a predetermined value in the rate-of-change information, and determine a predicted learning ability of the user at a time point corresponding to the first rate-of-change information as the maximum learning ability information.

Hereinafter, an educational content recommendation method, device, and system of the present invention will be described with reference to FIGS. 1 to 9.

FIG. 1 is a block diagram schematically illustrating an educational content recommendation system according to an exemplary embodiment of the present invention.

A system 10 for recommending educational content according to the exemplary embodiment of the present invention may include a user terminal 100 and an educational content recommendation device 1000.

The user terminal 100 may acquire a question database from the educational content recommendation device 1000 or an arbitrary external device. For example, the user terminal 100 may receive some questions included in the question database and display the received questions to the user. Subsequently, the user may input answers to the given questions to the user terminal 100.

The user terminal 100 may acquire learning data on the basis of the user's answers and transmit the learning data of the user to the educational content recommendation device 1000. The learning data may encompass identification information of the questions answered by the user, the user's answer information, correct and incorrect answer information, etc. for the questions. Meanwhile, the user terminal 100 may transmit the user information to the educational content recommendation device 1000.

The user terminal 100 may receive recommendation content calculated by the educational content recommendation device 1000 which will be described below. Also, the user terminal 100 may display the received recommendation content to the user.

The educational content recommendation device 1000 according to the exemplary embodiment of the present invention may include a transceiver 1100, a memory 1200, and a controller 1300.

The transceiver 1100 may communicate with any external device including the user terminal 100. For example, the educational content recommendation device 1000 may receive the learning data and/or user information of the user from the user terminal 100 through the transceiver 1100 or transmit the recommendation content to the user terminal 100.

The educational content recommendation device 1000 may access a network through the transceiver 1100 to transmit and receive various pieces of data. The transceiver 1100 may be a wired type or a wireless type. Since each of the wired type and the wireless type has advantages and disadvantages, both the wired type and the wireless type may be provided in the educational content recommendation device 1000 in some cases. The wireless type may employ a wireless local area network (WLAN)-based communication method such as Wi-Fi. Alternatively, the wireless type may employ cellular communication, for example, Long Term Evolution (LTE) or a fifth generation (5G) communication method. However, a wireless communication protocol is not limited to the above-described examples, and any appropriate wireless communication method may be used.

For example, the wired type typically employs LAN or universal serial bus (USB) communication and may also employ other communication methods.

The memory 1200 may store various pieces of information. In the memory 1200, various pieces of data may be temporarily or semi-permanently stored. Examples of the memory 1200 include a hard disk driver (HDD), a solid state drive (SSD), a flash memory, a read-only memory (ROM), a random access memory (RAM), etc. The memory 1200 may be provided in a form that is embedded in or detachable from the educational content recommendation device 1000. The memory 1200 may store an operating system (OS) for running the educational content recommendation device 1000, a program for operating each element of the educational content recommendation device 1000, and various pieces of data required for operations of the educational content recommendation device 1000.

The controller 1300 may control the overall operation of the educational content recommendation device 1000. For example, the controller 1300 may control an operation of appropriately distributing resources on the basis of learning data of a user, which will be described below, and determining a neural network model, an operation of acquiring target learning ability information, an operation of acquiring educational content, etc. Specifically, the controller 1300 may load a program for the overall operation of the educational content recommendation device 1000 from the memory 1200 and run the program. The controller 1300 may be implemented as an application processor (AP), a central processing unit (CPU), or a similar device on the basis of hardware, software, or a combination of hardware and software. As hardware, the controller 1300 may be provided in the form of an electronic circuit for processing an electrical signal to perform a control function. As software, the controller 1300 may be provided in the form of a program or code for operating a hardware circuit.

Operations of the educational content recommendation device 1000 according to the exemplary embodiment of the present invention will be described in detail below with reference to FIGS. 2 to 9.

The educational content recommendation device 1000 according to the exemplary embodiment of the present invention may perform an operation of recommending educational content on the basis of learning data of a user.

The related art is aimed at improving educational effects using more data, a more advanced algorithm, and more resources. However, since a neural network model or computing device that uses a better advanced algorithm and more resources demands relatively high costs of use, the fairness of education between rich people and poor people is being pointed out as a social problem. In other words, the related art clearly lacks consideration for the fairness or equality of education.

The educational content recommendation device 1000 according to the exemplary embodiment of the present invention can provide a favorable effect in that the fairness of education is ensured by appropriately adjusting or distributing limited resources used for recommending educational content on the basis of a user's learning ability. Also, the educational content recommendation device 1000 according to the exemplary embodiment of the present invention is configured to consider a user's probability of learning as a reference for appropriately adjusting or distributing resources and efficiently distributes resources according to the probability of learning. Accordingly, it is possible to provide optimal educational content, which corresponds to the user's probability of learning, to the user while ensuring the fairness of education.

Figure 2:
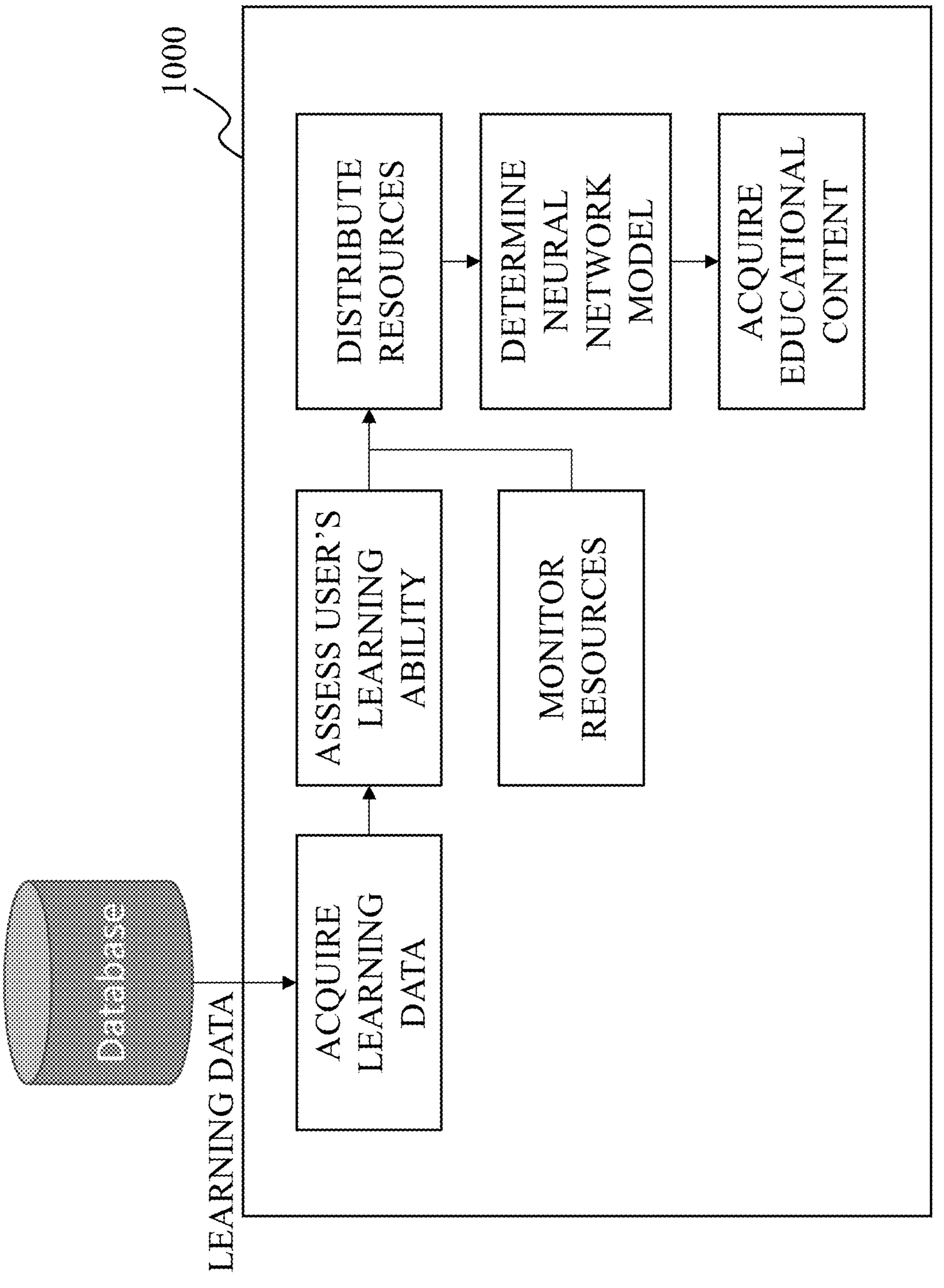
FIG. 2 is a diagram illustrating operations of a device for recommending educational content according to the exemplary embodiment of the present invention.

Operations of the educational content recommendation device 1000 according to the exemplary embodiment of the present invention will be described in detail below with reference to FIG. 2. FIG. 2 is a diagram illustrating operations of the educational content recommendation device 1000 according to the exemplary embodiment of the present invention.

The educational content recommendation device 1000 according to the exemplary embodiment of the present invention may acquire learning data from a database. As described above, the learning data may encompass any data related to learning of the user such as identification information of questions answered by the user, the user's answer information for the questions, and/or correct and incorrect answer information.

The educational content recommendation device 1000 according to the exemplary embodiment of the present invention may acquire question identification information, answer information of each of a plurality of users, and/or correct and incorrect answer information from the database.

The educational content recommendation device 1000 according to the exemplary embodiment of the present invention may perform an operation of assessing or calculating the user's learning ability. For example, the educational content recommendation device 1000 may calculate learning ability information by assessing the user's learning ability on the basis of the user's learning data. The learning ability may encompass the user's learning-related abilities, such as current scores, predicted scores, a reasoning sense, a logical sense, concentration, latent faculties, the maximum achievement of learning, the target achievement of learning, and the predicted achievement of learning related to various tests, that may be diagnosed using any method. Also, the learning ability information may encompass information obtained by quantifying the above-described learning ability and any form of information for quantifying the learning ability.

The educational content recommendation device 1000 according to the exemplary embodiment of the present invention may acquire the user's target learning ability information on the basis of the user's learning data. A method of calculating the user's target learning ability information will be described in detail below with reference FIGS. 4 to 6.

The educational content recommendation device 1000 according to the exemplary embodiment of the present invention may determine a neural network model on the basis of the user's target learning ability information. For example, when a first user's target learning ability information includes a first target learning ability value, a neural network model used for acquiring educational content may be determined as a first neural network model which demands first resources. Also, the educational content recommendation device 1000 may be implemented to distribute computing resources corresponding to first resources to the neural network model.

On the other hand, when a second user's target learning ability information includes a second target learning ability value, a neural network model used for acquiring educational content may be determined as a second neural network model which demands second resources. Also, the educational content recommendation device 1000 may be implemented to distribute computing resources corresponding to the second resources to the neural network model. The computing resources may encompass combinations of sizes, forms, etc. of a computation amount, memory, a network, etc.

Meanwhile, the educational content recommendation device 1000 according to the exemplary embodiment of the present invention may continuously monitor available computing resources. In this way, the educational content recommendation device 1000 may acquire information on resources to be distributed and determine resources to be distributed and a neural network model for acquiring educational content according to each user on the basis of the resource information.

The educational content recommendation device 1000 according to the exemplary embodiment of the present invention may acquire educational content through the determined neural network model. For example, a first educational content set may be acquired through the first neural network model which demands first resources, and a second educational content set, at least a part of which differs from the first educational content set, may be acquired through the second neural network model which demands second resources.

Figure 3:
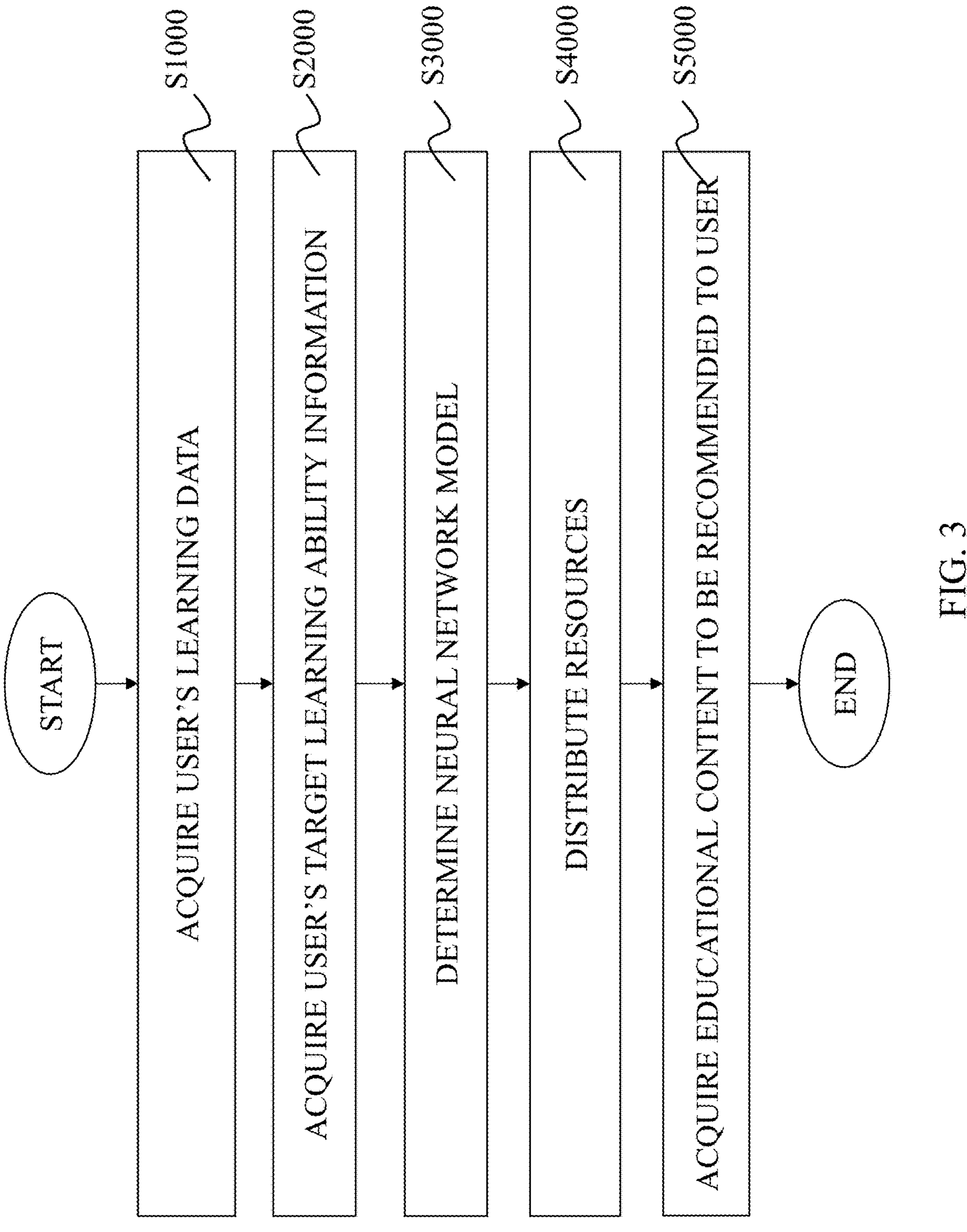
FIG. 3 is a flowchart illustrating a method of recommending educational content according to an exemplary embodiment of the present invention.

FIG. 3 is a flowchart illustrating a method of recommending educational content according to an exemplary embodiment of the present invention. The method of recommending educational content according to the exemplary embodiment of the present invention may include an operation S1000 of acquiring a user's learning data, an operation S2000 of acquiring the user's target learning ability information, an operation S3000 of determining a neural network model, an operation S4000 of distributing resources, and an operation S5000 of acquiring educational content to be recommended to the user.

In the operation S1000 of acquiring the user's learning data, the educational content recommendation device 1000 may acquire learning data received from the user terminal 100. As described above, the learning data may encompass question answering information including identification information of questions answered by the user, the user's answer information for the questions, correct and incorrect answer information, etc.

Also, the learning data may include the user's learning ability information over time. For example, the learning data may include first learning ability information at a first time point and/or second learning ability information at a second time point. For example, the first learning ability information may be the user's score information of an official test (e.g., test of English for international communication (TOEIC) or scholastic aptitude test (SAT)) at the first time point. The second learning ability information may be the user's score information of an official test (e.g., TOEIC or SAT) at the second time point. However, these are only exemplary, and as described above, the learning ability may encompass the user's learning-related abilities, such as current scores, predicted scores, a reasoning sense, a logical sense, concentration, and latent faculties related to various tests that may be diagnosed using any method. Also, the learning ability information may be information obtained by quantifying the above-described learning ability or any form of quantifiable information.

In the operation S2000 of acquiring the user's target learning ability information, the educational content recommendation device 1000 may calculate the user's target learning ability information on the basis of the user's learning data. As an example, the educational content recommendation device 1000 may estimate the user's predicted learning ability value on the basis of the user's learning data and calculate the user's maximum learning ability information on the basis of the estimated predicted learning ability value. Also, the educational content recommendation device 1000 may calculate the user's target learning ability information on the basis of the user's maximum learning ability information.

The user's maximum learning ability information and target learning ability information may be calculated in various ways.

A method of calculating a user's maximum learning ability information and target learning ability information according to the exemplary embodiment of the present invention will be described in detail below with reference to FIGS. 4 and 5.

Figure 4:
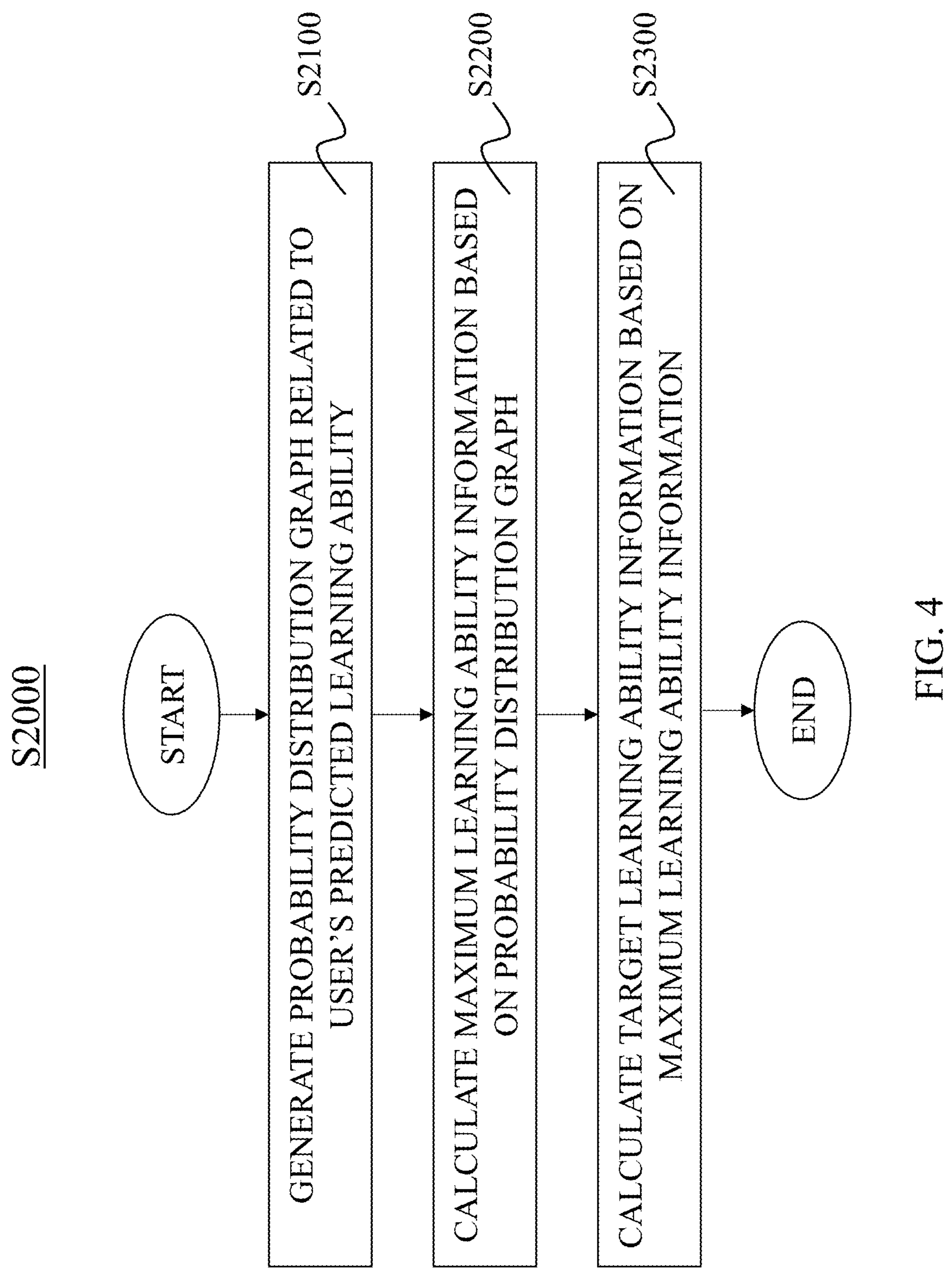
FIG. 4 is a detailed flowchart illustrating a method of acquiring a user's target learning ability information according to the exemplary embodiment of the present invention.
Figure 5:
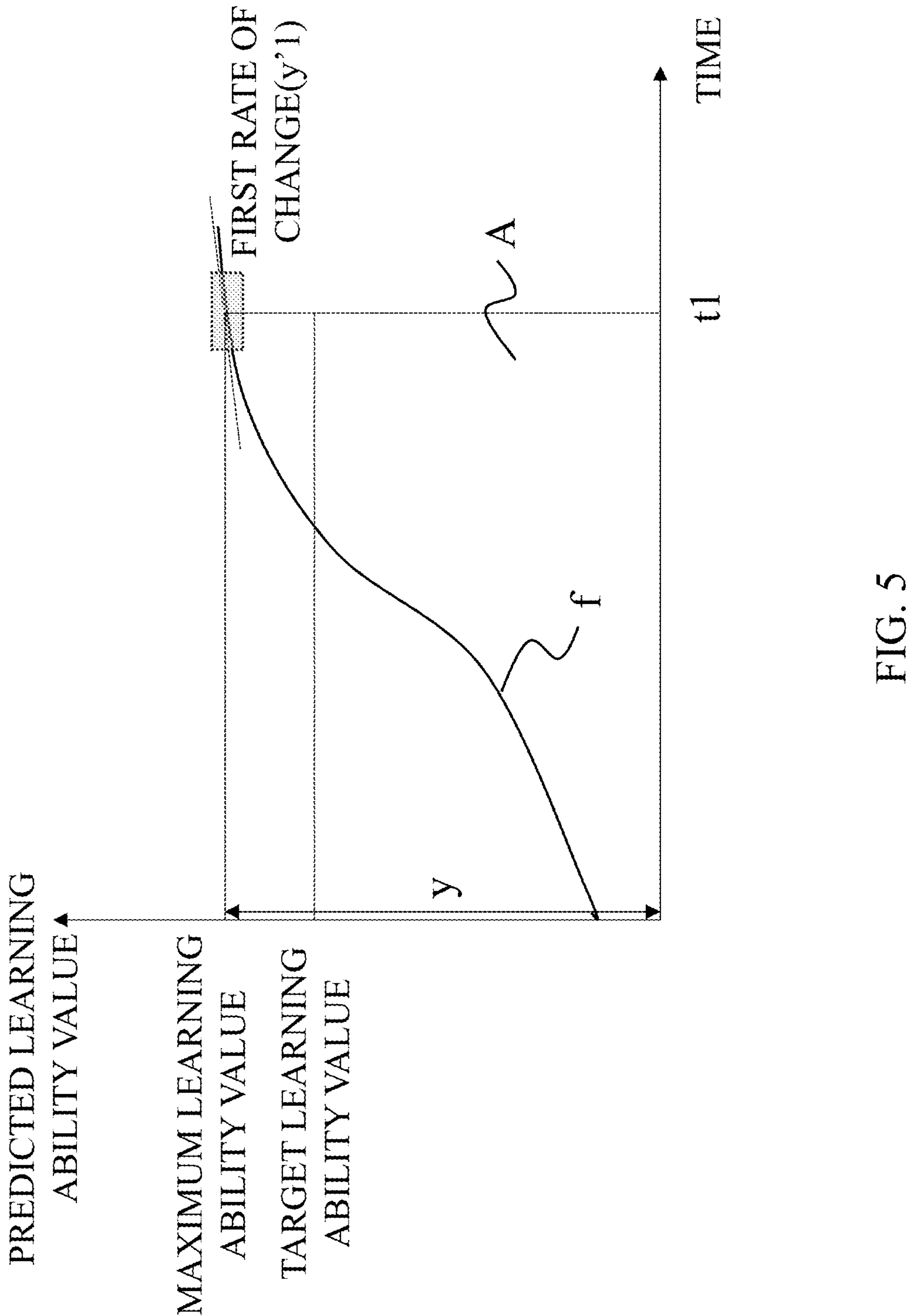
FIG. 5 is a graph illustrating an aspect of acquiring a user's target learning ability information according to the exemplary embodiment of the present invention.

FIG. 4 is a detailed flowchart illustrating a method of acquiring a user's target learning ability information according to the exemplary embodiment of the present invention. FIG. 5 is a graph illustrating an aspect of acquiring a user's target learning ability information according to the exemplary embodiment of the present invention.

The operation S2000 of acquiring the user's target learning ability information may include an operation S2100 of generating a probability distribution graph related to the user's predicted learning ability, an operation S2200 of calculating maximum learning ability information on the basis of the probability distribution graph, and an operation S2300 of calculating target learning ability information on the basis of the maximum learning ability information.

In the operation S2100 of generating the probability distribution graph related to the user's predicted learning ability, the educational content recommendation device 1000 may generate a probability distribution graph related to the user's predicted learning ability on the basis of the user's learning data. For example, the educational content recommendation device 1000 may be implemented to generate a probability distribution graph f on the basis of the user's learning ability information and the user's question answering information. For example, the educational content recommendation device 1000 may estimate the user's predicted learning ability value using any algorithm and/or trained neural network model. As a specific example, the educational content recommendation device 1000 may be implemented to estimate a probability distribution related to the user's predicted learning ability using the user's first learning ability information at the first time point, the user's second learning ability information at the second time point, and the user's question answering information at a time point between the first time point and the second time point. Also, the educational content recommendation device 1000 may generate the probability distribution graph f related to the user's predicted learning ability value on the basis of the estimated probability distribution.

In the operation S2200 of calculating the maximum learning ability information on the basis of the probability distribution graph f, the educational content recommendation device 1000 may calculate maximum learning ability information on the basis of the probability distribution graph f.

As an example, the educational content recommendation device 1000 may calculate maximum learning ability information on the basis of rate-of-change information of the probability distribution graph f. For example, the educational content recommendation device 1000 may calculate rate-of-change information y' of the probability distribution graph f and acquire first rate-of-change information y'l that is the rate-of-change information y' equal to or smaller than a predetermined rate of change. The educational content recommendation device 1000 may determine the user's predicted learning ability value at a time point t1 corresponding to the first rate-of-change y'l as maximum learning ability information. Alternatively, the educational content recommendation device 1000 may calculate rate-of-change information y" which represents how the rate-of-change is reduced and acquire second rate-of-change information that is the rate-of-change information y" equal to or smaller than a predetermined value. The educational content recommendation device 1000 may determine the user's predicted learning ability value at a time point corresponding to the second rate-of-change information as maximum learning ability information.

As another example, the educational content recommendation device 1000 may calculate maximum learning ability information on the basis of area information A of the probability distribution graph f. As a specific example, the educational content recommendation device 1000 may calculate maximum learning ability information on the basis of the area information of the generated probability distribution graph f and the predicted learning ability value y. For example, when a ratio (A/y) of the area information A to the predicted learning ability value y has a first value, the educational content recommendation device 1000 may allocate maximum learning ability information including a first maximum learning ability value to the user. When the ratio (A/y) of the area information A to the predicted learning ability value y has a second value, the educational content recommendation device 1000 may allocate maximum learning ability information including a second maximum learning ability value to the user.

In the operation S2300 of calculating the target learning ability information on the basis of the maximum learning ability information, the educational content recommendation device 1000 may calculate target learning ability information on the basis of the calculated maximum learning ability information. For example, the educational content recommendation device 1000 may acquire a predetermined ratio of the user's maximum learning ability value included in the maximum learning ability information as the user's target learning ability information. According to the exemplary embodiment of the present invention, the same ratio of maximum learning ability information of each of a plurality of users is calculated as target learning ability information, and thus the equity of education can be ensured for the users.

A process of generating a probability distribution graph related to a user's predicted learning ability and acquiring the user's maximum learning ability information on the basis of the probability distribution graph has been mainly described with reference to FIGS. 4 and 5. However, this is merely an example for the convenience of description, and a user's target learning ability information (or maximum learning ability information) may be acquired using any appropriate method.

Figure 6:
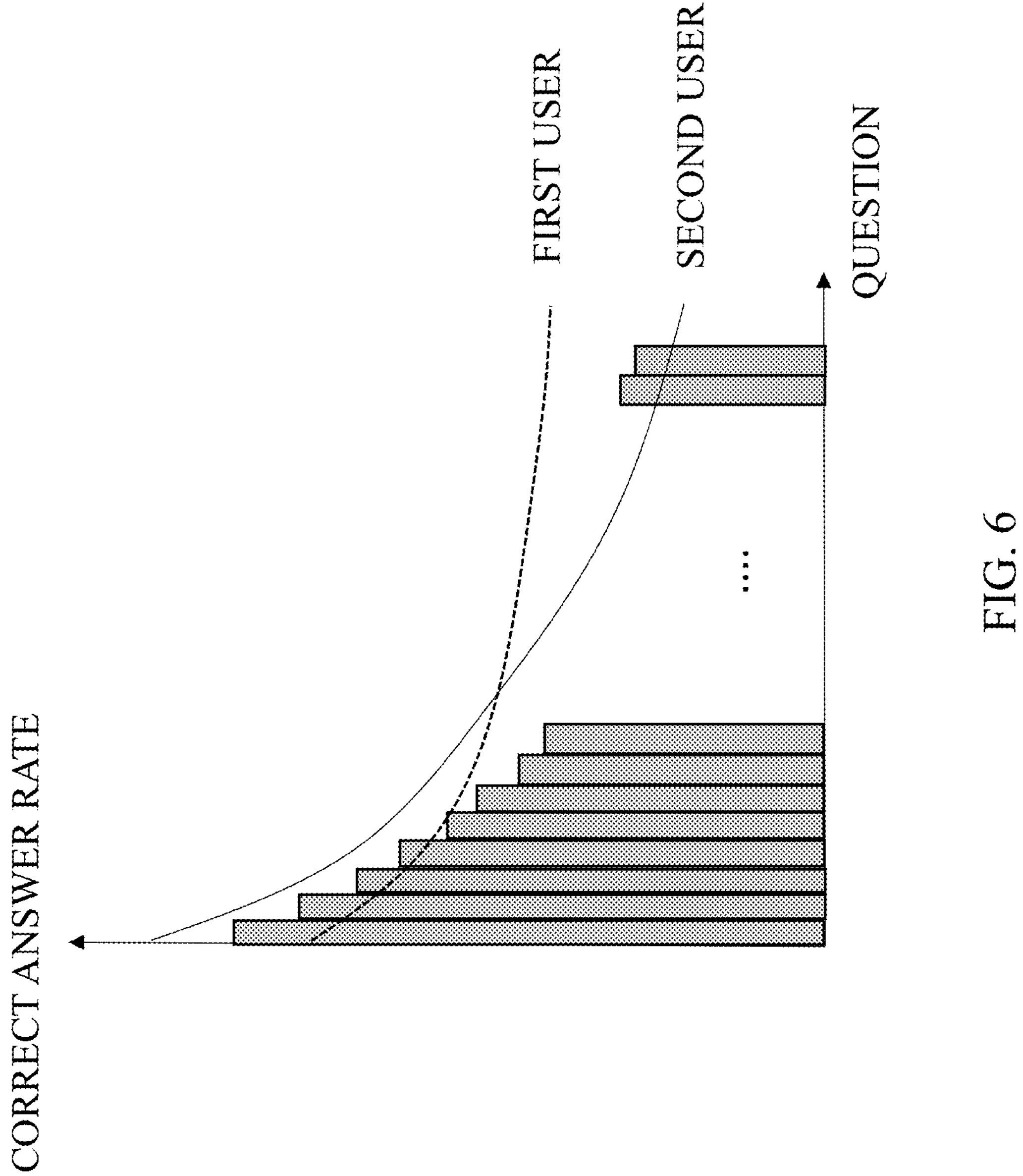
FIG. 6 is a graph illustrating another aspect of acquiring a user's target learning ability information according to the exemplary embodiment of the present invention.

See FIG. 6. FIG. 6 is a graph illustrating another aspect of acquiring a user's target learning ability information according to the exemplary embodiment of the present invention.

In the operation S2000 of acquiring the user's target learning ability information, the educational content recommendation device 1000 according to the exemplary embodiment of the present invention may calculate target learning ability information (or maximum learning ability information) on the basis of the user's question answering information. As a specific example, the educational content recommendation device 1000 may acquire question information and correct answer rate information related to each piece of the question information from the question database. Also, the educational content recommendation device 1000 may acquire the user's correct answer rate information related to question information corresponding to question information of the above-described question database from the user's learning data. The educational content recommendation device 1000 may calculate the user's target learning ability information on the basis of the user's correct answer rate related to the question information. As a specific example, a first user may show a relatively high correct answer rate related to questions having low correct answer rates. In this case, the educational content recommendation device 1000 may acquire target learning ability information including a first target learning ability value for the first user. On the other hand, a second user may show a relatively low correct answer rate related to questions having low correct answer rates. In this case, the educational content recommendation device 1000 may calculate target learning ability information including a second target learning ability value lower than the first target learning ability value for the second user.

Meanwhile, the educational content recommendation device 1000 may calculate the user's target learning ability value on the basis of the user's correct answer rate information and average answer rate information. For example, the educational content recommendation device 1000 may calculate the user's target learning ability value on the basis of the integral value of the average correct answer rate information and the user's correct answer rate information. As a specific example, when the integral value of the correct answer rate information of a user (e.g., the first user in FIG. 6) has a first value which is larger than a second value to be described below, the educational content recommendation device 1000 may calculate the target learning ability value of the user (e.g., the first user in FIG. 6) to be a relatively high value. On the other hand, when the integral value of the correct answer rate information of a user (e.g., the second user in FIG. 6) has a second value which is smaller than the first value described above, the educational content recommendation device 1000 may calculate the target learning ability value of the user (e.g., the second user in FIG. 6) to be a relatively low value.

The educational content recommendation device 1000 may take an average correct answer rate of questions into consideration to calculate a target learning ability value. For example, when a user shows a higher correct answer rate than an average correct answer rate with respect to questions having a lower correct answer rate than an average correct answer rate of a predetermined value, the user's target learning ability value may be calculated to be a relatively high value. On the other hand, when a user shows a lower correct answer rate than an average correct answer rate with respect to questions having a lower correct answer rate than the average correct answer rate of the predetermined value, the user's target learning ability value may be calculated to be a relatively low value.

As another example, when a user shows a higher correct answer rate than an average correct answer rate with respect to questions having a higher correct answer rate than the average correct answer rate of the predetermined value, the user's target learning ability value may be calculated to be a relatively high value. On the other hand, when a user shows a lower correct answer rate than an average correct answer rate with respect to questions having a higher correct answer rate than the average correct answer rate of the predetermined value, the user's target learning ability value may be calculated to be a relatively low value.

However, the above description is only exemplary for the convenience of description, and the educational content recommendation device 1000 may be implemented to calculate a user's target learning ability value using any appropriate method. For example, the educational content recommendation device 1000 may be implemented to calculate a user's target learning ability information by giving a first weight to a question having a low average correct answer rate and giving a second weight to a question having a high average correct answer rate. For such an operation, a reference average correct answer rate may be set in advance as a reference for distinguishing between a question having a high average correct answer rate and a question having a low average correct answer rate. As another example, the educational content recommendation device 1000 may be implemented to acquire a time taken to answer a question from the user's question answering information and calculate the user's target learning ability value on the basis of the time taken to answer a question.

Referring back to FIG. 3, the method of recommending educational content according to the exemplary embodiment of the present invention may include an operation S3000 of determining a neural network model. In the operation S3000 of determining the neural network model, the educational content recommendation device 1000 may determine a neural network on the basis of the user's target learning ability information.

Figure 7:
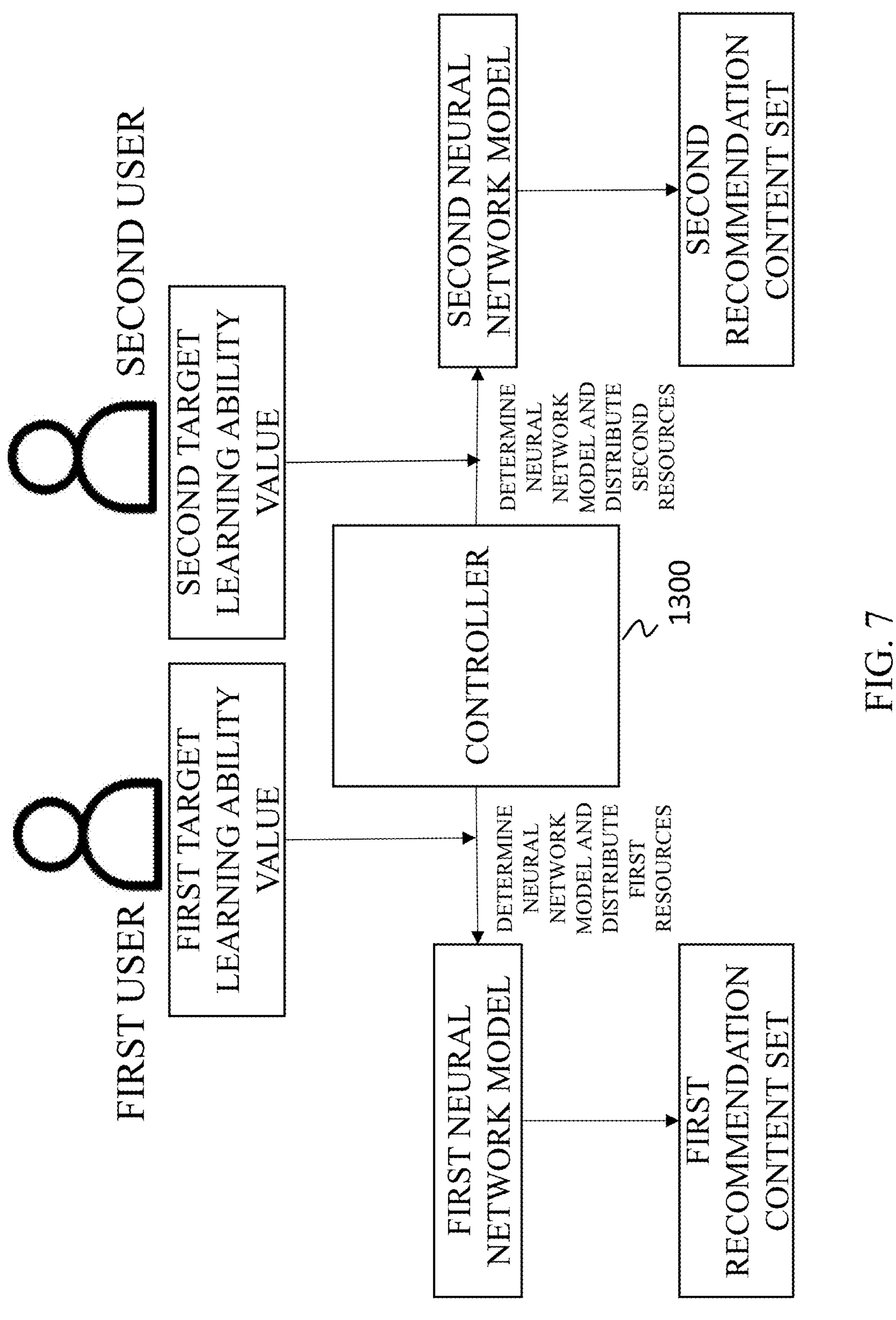
FIG. 7 is a diagram illustrating an aspect of determining a neural network model on the basis of a user's learning ability according to the exemplary embodiment of the present invention.

FIG. 7 is a diagram illustrating an aspect of determining a neural network model on the basis of a user's learning ability according to the exemplary embodiment of the present invention.

The educational content recommendation device 1000 according to the exemplary embodiment of the present invention may determine a neural network model on the basis of the user's target learning ability information. Specifically, when the user's target learning ability information includes a small ability value, the educational content recommendation device 1000 may be implemented to use a neural network model demanding a larger amount of resources to acquire recommendation content. For example, it is assumed that the first user is calculated to have target learning ability information including a first target learning ability value, and the second user is calculated to have target learning ability information including a second target learning ability value which is lower than the first target learning ability value. The educational content recommendation device 1000 may determine the first neural network model as the neural network model so that educational content for the first user is acquired using the first neural network model demanding first resources. On the other hand, the educational content recommendation device 1000 may determine the second neural network model as the neural network model so that educational content is acquired for the second user who has a lower target learning ability value using the second neural network model demanding second resources which are "greater" than first resources.

Referring back to FIG. 3, the method of recommending educational content according to the exemplary embodiment of the present invention may include an operation S4000 of distributing the resources. Specifically, in the operation S4000 of distributing the resources, the educational content recommendation device 1000 may distribute resources corresponding to the determined neural network model. The resources to be distributed may be adjusted to optimum resources for the determined neural network model or distributed to the determined neural network model. For example, referring back to FIG. 7, when the first neural network model is determined as the neural network model, the educational content recommendation device 1000 may be implemented to distribute first resources required for the first neural network model. On the other hand, when the second neural network model is determined as the neural network model, the educational content recommendation device 1000 may be implemented to distribute second resources required for the second neural network model.

Referring back to FIG. 3, the method of recommending educational content according to the exemplary embodiment of the present invention may include an operation S5000 of acquiring educational content to be recommended to the user. Specifically, in the operation S5000 of acquiring the educational content to be recommended to the user, educational content to be recommended to the user may be acquired through the determined neural network. For example, referring back to FIG. 7, the educational content recommendation device 1000 may be implemented to acquire a first recommendation content set for the first user through the first neural network model. On the other hand, the educational content recommendation device 1000 may be implemented to acquire a second recommendation content set including educational content, at least a part of which differs from the first recommendation content set, for the second user through the second neural network model. As described above, the second neural network model uses greater resources to acquire a recommendation content set, and thus a probability that the user achieves the target learning ability value can be increased.

Figure 8:
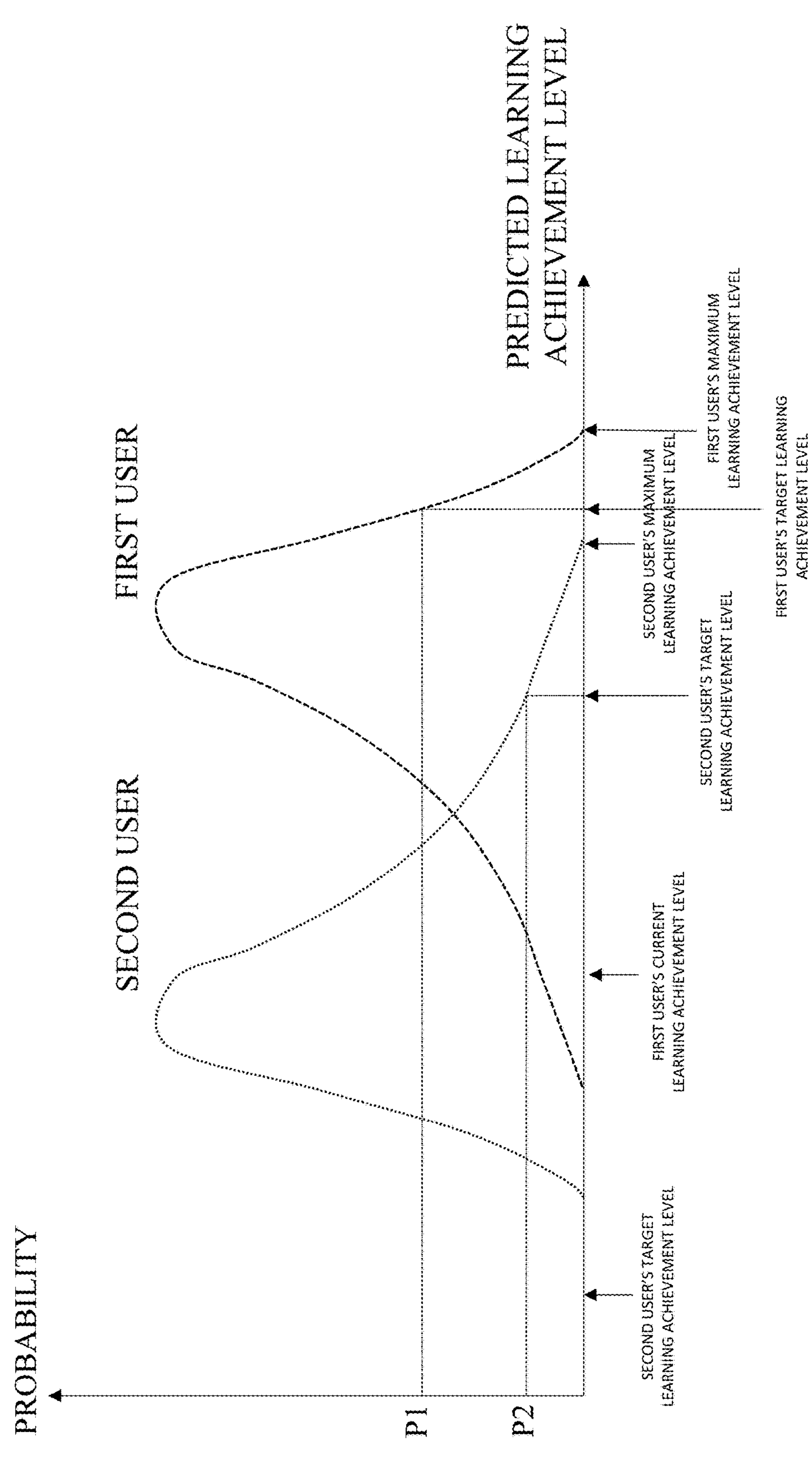
FIG. 8 is a graph illustrating probability distributions of users' predicted learning achievement levels when educational content is recommended without considering the users' learning abilities according to the related art.

See FIG. 8. FIG. 8 is a graph illustrating probability distributions of users' predicted learning achievement levels when educational content is recommended without considering the users' learning abilities according to the related art. Specifically, FIG. 8 is an exemplary graph illustrating probability distributions of predicted learning achievement levels when users learn educational content acquired using the same resources and the same neural network model.

For example, the second user may have a lower current learning achievement level than the first user. Also, the second user's maximum learning achievement level, which is calculated on the basis of the second user's learning data, may be lower than the first user's maximum learning achievement level. The second user's target learning achievement level, which is calculated as the predetermined ratio of the maximum learning achievement level, may be lower than the first user's target learning achievement level. A probability that the second user achieves the target learning ability value by performing learning on the basis of the recommendation content is a second probability value P2 and may be lower than a first probability value P1 that the first user achieves the target learning ability value by performing learning on the basis of the recommendation content. In other words, when users perform learning on the basis of educational content acquired using the same resources and the same neural network model without considering the users' current learning achievement levels or maximum learning achievement levels (or target learning achievement levels), users may show different achievement levels even with the same amount of effort invested. In other words, there is a high probability that the fairness of education is not ensured.

On the other hand, when a user performs learning on the basis of educational content acquired through the educational content recommendation device 1000 which determines a neural network model in consideration of the user's maximum target ability information (or target ability information) and distributes resources corresponding to the neural network model, the fairness of education can be ensured.

Figure 9:
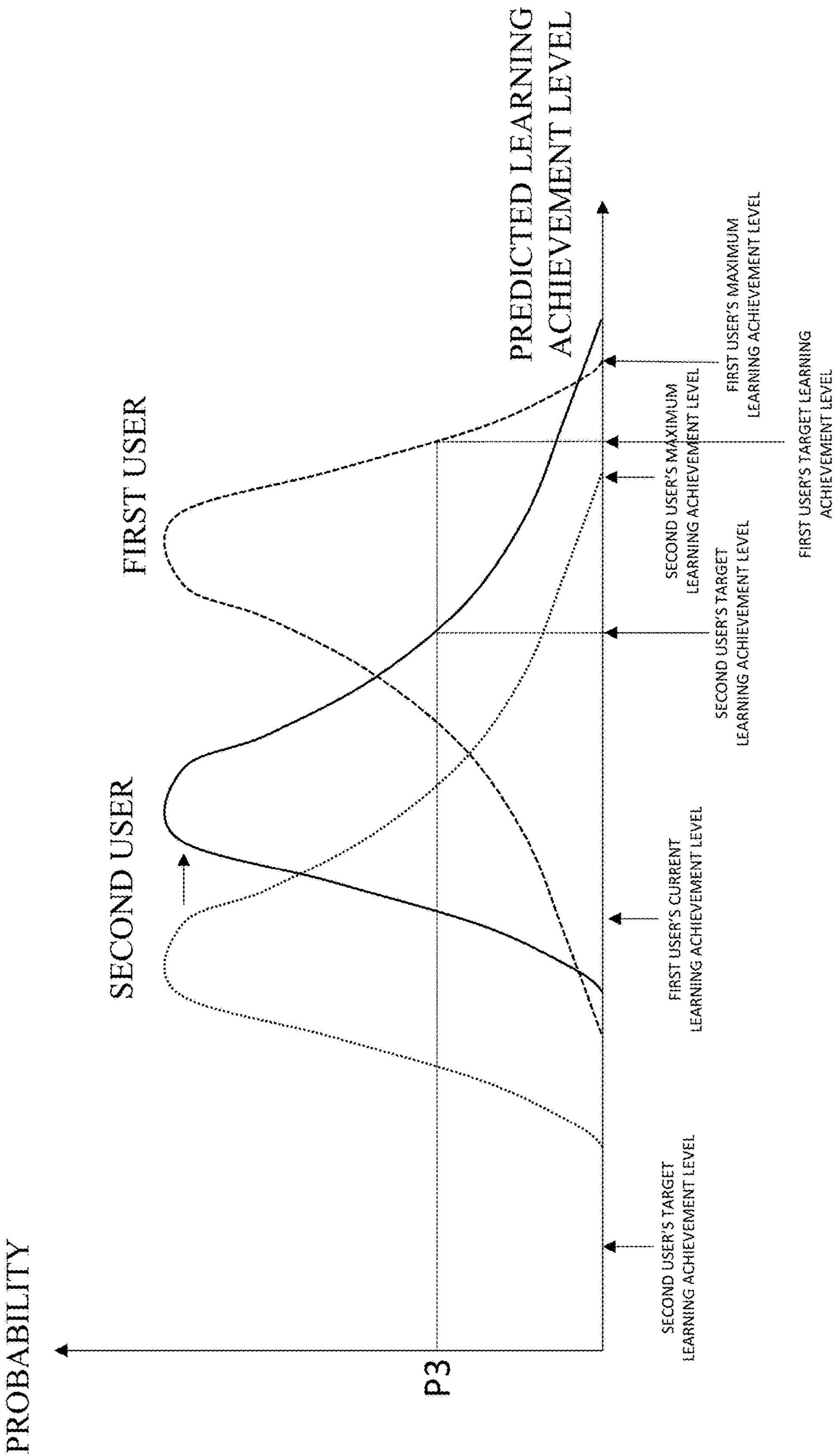
FIG. 9 is a graph illustrating probability distributions of users' predicted learning achievement levels when resources are distributed in consideration of the users' learning abilities according to the exemplary embodiment of the present invention.

See FIG. 9. FIG. 9 is a graph illustrating probability distributions of users' predicted learning achievement levels when resources are distributed in consideration of the users' learning abilities according to the exemplary embodiment of the present invention. Specifically, when educational content acquired through a neural network model which demands more resources is recommended to a second user showing a relatively low maximum learning achievement level (or a target learning achievement level) for learning, a probability distribution graph related to the second user's predicted learning achievement level may be formed on the right side of the probability distribution graph of a case in which educational content is recommended without considering the user's learning ability. Accordingly, a probability that the second user achieves the target learning achievement level by performing learning on the basis of the recommendation content is a third probability value P3 which may become similar to the first probability value P1 which is a probability that the first user achieves the target learning ability level by performing learning on the basis of the recommendation content. In other words, according to the exemplary embodiment of the present invention, neural network models are determined in consideration of users' current learning achievement levels or maximum learning achievement level (or target learning achievement levels), and resources are distributed according to the neural network models to acquire educational content. When the users perform learning on the basis of the acquired educational content, the users can achieve their target learning achievement levels with similar probabilities. In other words, the fairness of education can be ensured.

Meanwhile, FIGS. 2 and 3 illustrate that a neural network model is determined first and then resources corresponding to the determined neural network model are distributed. However, this is only exemplary, and the educational content recommendation device 1000 may be implemented to distribute resources according to a user's target learning ability information first and recommend educational content using a neural network model corresponding to the distributed resources.

The educational content recommendation device 1000 according to the exemplary embodiment of the present invention can provide educational content that is most helpful for users to improve their abilities by acquiring educational content on the basis of the users' learning ability information.

In particular, the educational content recommendation device 1000 according to the exemplary embodiment of the present invention can ensure the equity of education by appropriately distributing resources required for a neural network model that acquires educational content on the basis of users' target learning ability information.

The above-described various operations of the educational content recommendation device 1000 may be stored in the memory 1200 of the educational content recommendation device 1000, and the controller 1300 of the educational content recommendation device 1000 may perform the stored operations.

The method, device, and system for recommending educational content according to the exemplary embodiments of the present invention can select educational content in consideration of a user's learning ability and provide the user with educational content that is most helpful for the user to improve his or her ability.

The method, device, and system for recommending educational content according to the exemplary embodiments of the present invention can ensure the equity of education by appropriately distributing resources required for selecting educational content according to users' learning abilities.

Effects of the present invention are not limited to those described above, and other effects which have not been described above will be clearly understood by those of ordinary skill in the art from the specification and accompanying drawings.

The features, structures, effects, etc. described in the exemplary embodiments are included in at least one embodiment of the present invention and are not necessarily limited to one embodiment. Further, the features, structures, effects, etc. provided in each embodiment can be combined or modified in other embodiments by those of ordinary skill in the art to which the embodiments belong. Accordingly, contents related to the combination and modification should be construed to be included in the scope of the present invention.

Although embodiments of the present invention have been described above, these are just examples and do not limit the present invention. The present invention can be changed and modified in various ways not illustrated above without departing from the essential features of the present invention by those of ordinary skill in the art. In other words, each element described in detail in the embodiments can be modified. Also, differences related to the modification and application should be construed as falling within the scope of the present invention which is defined by the accompanying claims.

What is claimed is:

1. A method of recommending educational content by a device for analyzing learning data of a user, the device including a transceiver configured to communicate with a user terminal, a memory storing computer-readable instructions and a processor configured to execute the instructions to perform the method comprising:

acquiring the learning data of the user received from the user terminal through the transceiver, wherein the learning data includes first learning ability information of the user at a first time point, second learning ability information of the user at a second time point, and question answering information of the user during a time period between the first time point and the second time point;

acquiring target learning ability information of the user using a trained neural network model based on the learning data;

monitoring computing resources of the device, wherein the computing resources include a computation amount, memory or a network of the device, and wherein the monitoring comprises:

(i) continuously monitoring available computing resources of the device, (ii) acquiring resource information on computing resources to be distributed based on the continuously monitored available computing resources, and (iii) determining the computing resources to be distributed based on the resource information;

determining a neural network model based on the resource information and the target learning ability information;

distributing the computing resources of the device to correspond to the determined neural network model, wherein the distributing of the computing resources comprises adjusting the computing resources to be distributed to computing resources corresponding to the determined neural network model; and acquiring educational content to be recommended to the user through the determined neural network model and transmitting the educational content to the user terminal through the transceiver, wherein the determining of the neural network model comprises:

determining a first neural network model which demands first computing resources when the target learning ability information of the user includes a first target learning ability value and determining a second neural network model which demands second computing resources greater than the first computing resources when the target learning ability information of the user includes a second target learning ability value lower than the first target learning ability value, and wherein the distributing of the computing resources comprises:

distributing the first computing resources to the first neural network model based on the first neural network model being determined and distributing the second computing resources to the second neural network model based on the second neural network model being determined, and wherein the acquiring of the educational content comprises:

acquiring a first educational content through the first neural network model based on the first neural network model being determined and acquiring a second educational content through the second neural network model based on the second neural network model being determined, at least a part of the second educational content being different from the first educational content.

2. The method of claim 1, wherein the acquiring of the target learning ability information comprises:

calculating maximum learning ability information based on the learning data; and acquiring the target learning ability information based on the maximum learning ability information, wherein the target learning ability information is determined to be a predetermined ratio of a maximum learning ability value included in the maximum learning ability information.

3. The method of claim 2, wherein the calculating of the maximum learning ability information comprises:

generating a probability distribution graph related to a predicted learning ability of the user based on the first learning ability information, the second learning ability information, and the question answering information; and calculating the maximum learning ability information based on the probability distribution graph.

4. The method of claim 3, wherein the calculating of the maximum learning ability information based on the probability distribution graph comprises:

acquiring rate-of-change information of the probability distribution graph;

acquiring first rate-of-change information including a smaller value than a predetermined rate of change in the rate-of-change information; and determining a predicted learning ability of the user at a time point corresponding to the first rate-of-change information as the maximum learning ability information.

5. A non-transitory computer-readable recording medium in which a computer program executed by a computer is recorded, the computer program comprising:

acquiring learning data of a user received from a user terminal through a transceiver of the computer, wherein the learning data includes first learning ability information of the user at a first time point, second learning ability information of the user at a second time point, and question answering information of the user during a time period between the first time point and the second time point;

acquiring target learning ability information of the user using a trained neural network model based on the learning data;

monitoring computing resources of the computer, wherein the computing resources include a computation amount, memory or a network of the computer, and wherein the monitoring comprises:

(i) continuously monitoring available computing resources of the computer, (ii) acquiring resource information on computing resources to be distributed based on the continuously monitored available computing resources, and (iii) determining the computing resources to be distributed based on the resource information;

determining a neural network model based on the resource information and the target learning ability information;

distributing the computing resources of the computer to correspond to the determined neural network model, wherein the distributing of the computing resources comprises adjusting the computing resources to be distributed to computing resources corresponding to the determined neural network model; and acquiring educational content to be recommended to the user through the determined neural network model and transmitting the educational content to the user terminal through the transceiver, wherein the determining of the neural network model comprises:

determining a first neural network model which demands first computing resources when the target learning ability information of the user includes a first target learning ability value and determining a second neural network model which demands second computing resources greater than the first computing resources when the target learning ability information of the user includes a second target learning ability value lower than the first target learning ability value, wherein the distributing of the computing resources comprises:

distributing the first computing resources to the first neural network model based on the first neural network model being determined and distributing the second computing resources to the second neural network model based on the second neural network model being determined, and wherein the acquiring of the educational content comprises:

acquiring a first educational content through the first neural network model based on the first neural network model being determined and acquiring a second educational content through the second neural network model based on the second neural network model being determined, at least a part of the second educational content being different from the first educational content.

6. A device for receiving learning data of a user from an external user terminal and recommending educational content, the device comprising:

a transceiver configured to communicate with the user terminal;

a memory storing computer-readable instructions; and a controller configured to execute the instructions to acquire the learning data of the user received from the user terminal through the transceiver and determine educational content based on the learning data, wherein the learning data includes first learning ability information of the user at a first time point, second learning ability information of the user at a second time point, and question answering information of the user during a time period between the first time point and the second time point, wherein the controller is further configured to execute the instructions to:

acquire target learning ability information of the user using a trained neural network model based on the learning data, monitor computing resources of the device, wherein the computing resources include a computation amount, memory or a network of the device, and wherein the monitoring comprises:

(i) continuously monitoring available computing resources of the device, (ii) acquiring resource information on computing resources to be distributed based on the continuously monitored available computing resources, and (iii) determining the computing resources to be distributed based on the resource information, determine a neural network model based on the resource information and the target learning ability information, distribute the computing resources of the device to correspond to the determined neural network model, wherein the distributing of the computing resources comprises adjusting the computing resources to be distributed to computing resources corresponding to the determined neural network model, and acquire educational content to be recommended to the user through the determined neural network model and transmit the educational content to the user terminal through the transceiver, wherein the controller is further configured to execute the instructions to:

determine a first neural network model which demands first computing resources when the target learning ability information of the user includes a first target learning ability value and determine a second neural network model which demands second computing resources greater than the first computing resources when the target learning ability information of the user includes a second target learning ability value lower than the first target learning ability value, wherein the controller is further configured to execute the instructions to:

distribute the first computing resources to the first neural network model based on the first neural network model being determined and distribute the second computing resources to the second neural network model based on the second neural network model being determined, and wherein the controller is further configured to execute the instructions to:

acquire a first educational content through the first neural network model based on the first neural network model being determined and acquire a second educational content through the second neural network model based on the second neural network model being determined, at least a part of the second educational content being different from the first educational content.

7. The device of claim 6, wherein the controller is further configured to execute the instructions to acquire maximum learning ability information based on the learning data and acquire the target learning ability information based on the maximum learning ability information, wherein the target learning ability information is determined to be a predetermined ratio of a maximum learning ability value included in the maximum learning ability information.

8. The device of claim 7, wherein the controller is further configured to execute the instructions to generate a probability distribution graph related to a predicted learning ability of the user based on the first learning ability information, the second learning ability information, and the question answering information and calculate the maximum learning ability information based on the probability distribution graph.

9. The device of claim 8, wherein the controller is further configured to execute the instructions to acquire rate-of-change information of the probability distribution graph, acquire first rate-of-change information including a smaller value than a predetermined value in the rate-of-change information, and determine a predicted learning ability of the user at a time point corresponding to the first rate-of-change information as the maximum learning ability information.

* * * * *